United States Patent
Chen et al.

(10) Patent No.: US 7,503,053 B2
(45) Date of Patent: Mar. 10, 2009

(54) APPARATUS AND METHOD OF EJECTING A DISC IN A DISC DRIVE

(75) Inventors: Chi-Hung Chen, Taipei (TW); Chia-Hsuan Chiang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 470 days.

(21) Appl. No.: 11/445,155

(22) Filed: Jun. 2, 2006

(65) Prior Publication Data
US 2007/0028248 A1    Feb. 1, 2007

(30) Foreign Application Priority Data
Aug. 1, 2005    (TW)    ................. 94126101 A

(51) Int. Cl.
*G11B 17/04*    (2006.01)
(52) U.S. Cl. ........................ 720/601; 369/79
(58) Field of Classification Search ......... 720/601–602, 720/604, 606, 609–610, 613, 636–639, 641, 720/645, 655; 369/53.3, 79
See application file for complete search history.

(56) References Cited

U.S. PATENT DOCUMENTS

| | | | |
|---|---|---|---|
| 5,119,357 A | * | 6/1992 | Tsuruta et al. ............... 720/608 |
| 5,883,870 A | * | 3/1999 | Akiba et al. ................. 720/602 |
| 6,697,321 B2 | * | 2/2004 | Inata et al. ................... 720/700 |
| 6,947,355 B2 | * | 9/2005 | Hong et al. .................. 720/601 |
| 2004/0223415 A1 | * | 11/2004 | Lee et al. ................. 369/30.03 |

FOREIGN PATENT DOCUMENTS

| | | | |
|---|---|---|---|
| JP | 56011666 A | * | 2/1981 |
| JP | 2001126356 A | * | 5/2001 |
| JP | 2004227714 A | * | 8/2004 |
| JP | 2005182905 A | * | 7/2005 |

OTHER PUBLICATIONS

English abstract of JP 2005182905 A.*
English abstract of JP 2004227714 A.*
English abstract of JP 2001126356 A.*
English abstract of JP 56011666 A.*

* cited by examiner

*Primary Examiner*—Andrea L Wellington
*Assistant Examiner*—Nathan Danielsen
(74) *Attorney, Agent, or Firm*—Rabin & Berdo, PC

(57) ABSTRACT

An apparatus and a method of ejecting a disc for a disc drive. The disc drive at least includes a bottom casing and a tray. The tray is used for carrying a disc. The disc loading apparatus for a disc drive includes a protruding portion and a brake pad. The protruding portion is disposed on the bottom casing. The brake pad is movably disposed at the tray. When the tray is moved with respect to the bottom casing for enabling the protruding portion to interfere with the brake pad, the protruding portion pushes the brake pad to projects towards the disc for interfering with the disc so that the disc is halted and pushed up.

20 Claims, 4 Drawing Sheets

APPARATUS AND METHOD OF EJECTING A DISC IN A DISC DRIVE

This application claims the benefit of Taiwan application Serial No. 94126101, filed Aug. 1, 2005, the subject matter of which is incorporated herein by reference.

BACKGROUND OF THE INVENTION

1. Field of the Invention

The invention relates in general to an apparatus and a method of ejecting a disc for a disc drive, and more particularly to an apparatus and a method of ejecting a disc for a disc drive capable of halting and pushing up the disc.

2. Description of the Related Art

There are a large variety of optical disc drives and optical disc recorders currently available on the market. In order to further improve the read/write speed, the rotation speed is thus designed to be faster and faster. However, in the course of unloading a disc, it is possible that the disc may be thrown off the tray if the disc is only subject to the momentum without being reduced the rotation speed. Therefore, the manufacturers of optical disc drives are dedicated to the research regarding the brake mechanism of the disc so as to assure the safety of use. Examples of disc braking technology include anti-friction plate which halts the disc by interfering with its peripheral. According to the disc drive disposed in a notebook, a disc is loaded on a spindle and then rotates. When the disc is to be unloaded, the user has to push up the disc from the spindle first, which is very inconvenient to the user.

SUMMARY OF THE INVENTION

It is therefore an object of the invention to provide an apparatus and a method of ejecting a disc for a disc drive. In the course of ejecting the disc, both of the top and the bottom of the disc are interfered for halting the disc. Furthermore, the disc is pushed up directly, and the user does not need to push up the disc from the spindle first.

The embodiment of the invention achieves the above-identified object by providing an apparatus of ejecting a disc for a disc drive. The disc drive includes a bottom casing and a tray. The tray is used for carrying a disc. The disc ejecting apparatus for the disc drive includes a protruding portion and a brake pad. The protruding portion is disposed on the bottom casing. The brake pad is movably disposed at the tray. When the tray is moved with respect to the bottom casing for enabling the protruding portion to interfere with the brake pad, the protruding portion pushes the brake pad to project towards the disc for interfering with the disc so that the disc is halted and pushed up.

The embodiment of the invention further achieves the above-identified object by providing a disc loading method for a disc drive. The disc drive at least includes a bottom casing and a tray. The tray is used for carrying a disc. The disc loading method for a disc drive includes the following steps. Firstly, the tray is moved with respect to the bottom casing. The tray has a brake pad, and the bottom casing has a protruding portion. Then, the protruding portion interferes with the brake pad to push the brake pad. Next, the brake pad interferes with the disc.

The embodiment of the invention further achieves the above-identified object by providing yet another disc drive including a top casing, a bottom casing, a tray, and a disc ejecting apparatus. The tray is disposed between the top casing and the bottom casing for carrying a disc. The disc ejecting apparatus includes a protruding portion and a brake pad. The protruding portion is disposed on the bottom casing. The brake pad is movably disposed at the tray. When the tray is moved with respect to the bottom casing and the protruding portion interferes with the brake pad, the protruding portion push the brake pad to project towards the disc so that the disc is halted and pushed up.

Other objects, features, and advantages of the invention will become apparent from the following detailed description of the preferred but non-limiting embodiments. The following description is made with reference to the accompanying drawings.

DETAILED DESCRIPTION OF THE INVENTION

In the course of ejecting a disc, the embodiment of the invention uses a protruding portion to interfere with a brake pad and raise the brake pad for contact with the disc, so that the disc is halted and pushed up by the brake pad. The disc drive can be an optical disc drive or an optical disc recorder.

Figure 1:
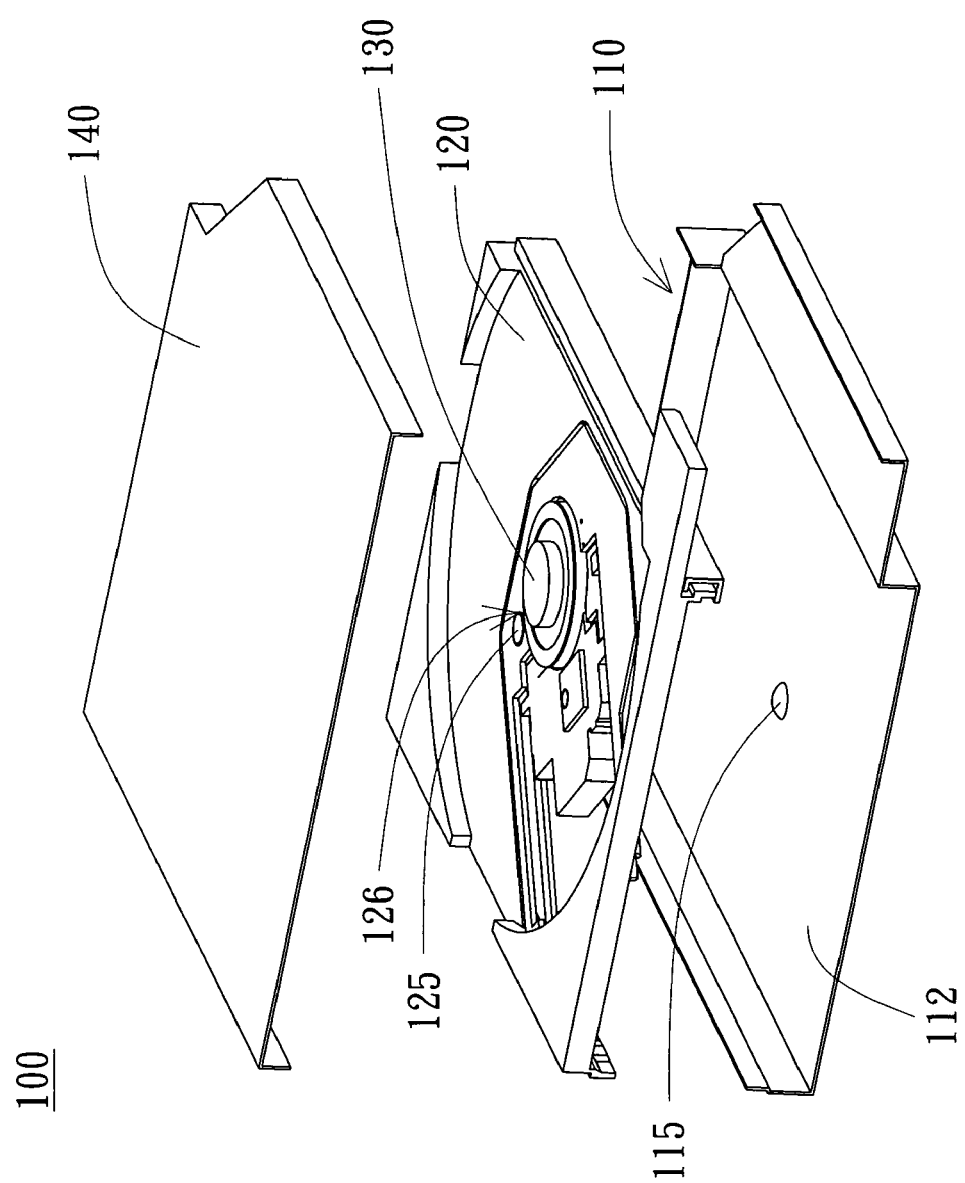
FIG. 1 illustrates an exploded diagram of a disc drive and its disc ejecting apparatus according to a preferred embodiment of the invention.

Referring to FIG. 1, an exploded diagram of a disc drive and its disc ejecting apparatus according to a preferred embodiment of the invention is shown. The disc drive 100 includes a bottom casing 110, a tray 120, a spindle 130 and a top casing 140. The bottom casing 110 and the top casing 140 form an accommodation space for receiving the tray 120. The spindle 130 passes through the center of the tray 120. The inner surface 112 of the bottom casing 110 has a protruding portion 115 disposed thereon. The tray 120 further has a hole 126. A brake pad 125 is movably disposed at the tray 120 and penetrates through the hole 126.

Figure 2:
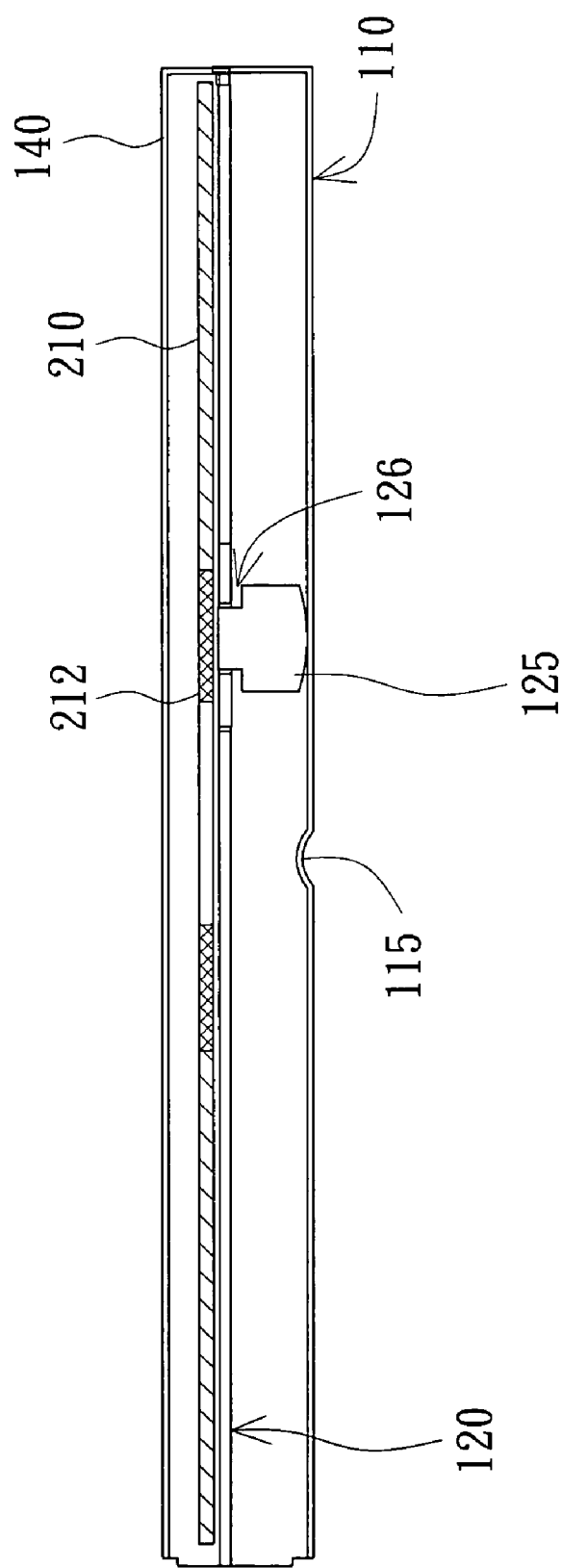
FIG. 2 illustrates an enlarged cross-sectional view of the disc drive according to the preferred embodiment of the invention.

Referring to FIG. 2, an enlarged cross-sectional view of the disc drive according to a preferred embodiment of the invention is shown. The tray 120 is positioned at the accommodation space formed by the bottom casing 110 and the top casing 140. A disc 210 is placed on the tray 120. The brake pad 125 projects from the hole 126. In the present embodiment of the invention, the hole 126 is preferably corresponding to the inner track 212 of the disc 210. Meanwhile, the disc drive 100 is in use, so the protruding portion 115 and the brake pad 125 do not interfere with each other.

Referring to FIG. 3A~3D, operational views of the disc ejecting apparatus for a disc drive of the invention when ejecting a disc are shown. Firstly, referring to FIG. 3A, the tray 120 is moved with respect to the bottom casing 110 and drives the brake pad 125 to move. Meanwhile, the brake pad 125 disposed on the tray 120 still does not get into contact with the protruding portion 115 disposed on the bottom casing 110. The brake pad 125 further includes a first interference portion 127 and a second interference portion 128. The cross-sectional area of the first interference portion 127 is smaller than the cross-sectional area of the second interference portion 128. When the protruding portion 115 interferes with the second interference portion 128, the first interference portion 127 enables to interfere with the disc 210. According to the present embodiment of the invention, the hole 126 is preferably corresponding to the inner track 212 of the disc 210, and the size of the hole 126 must at least be equal to the cross-sectional area of the first interference portion 127 but smaller than the cross-sectional area of the second interference portion 128. According to the present embodiment of the invention, the size of hole 126 is preferably larger than the cross-sectional area of the first interference portion 127. The protruding portion 115 has an apex 117. The protruding portion 115 does not get into contact with the brake pad 125. Meanwhile, the vertical distance d1 between the top surface 129 of the second interference portion 128 and the bottom surface 122 of the tray 120 is at least equal to the vertical distance d2 between the apex 117 and the inner surface 112 of the bottom casing 110, lest the second interference portion 128 might raise the tray 120 up. In the present embodiment of the invention, the vertical distance d1 is preferably equal to the vertical distance d2. The vertical distance d3 between the top surface 123 of the first interference portion 127 and the disc 210 is smaller than d2, so that the disc 210 is raised by the first interference portion 127 when the brake pad is moved to the apex 117.

Figure 3A:
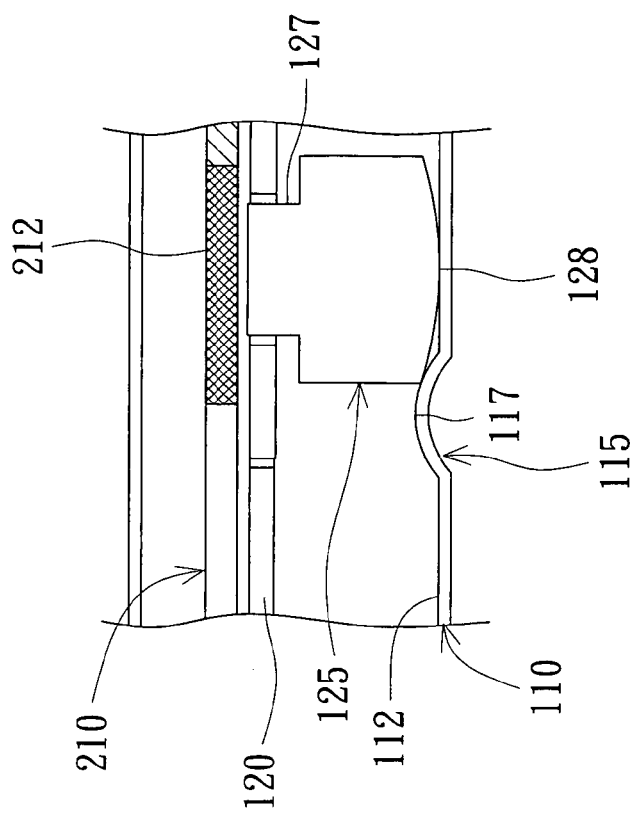
FIG. 3A~3D illustrate operational views of the disc ejecting apparatus for a disc drive according to the preferred embodiment of the invention when ejecting a disc.
Figure 3B:
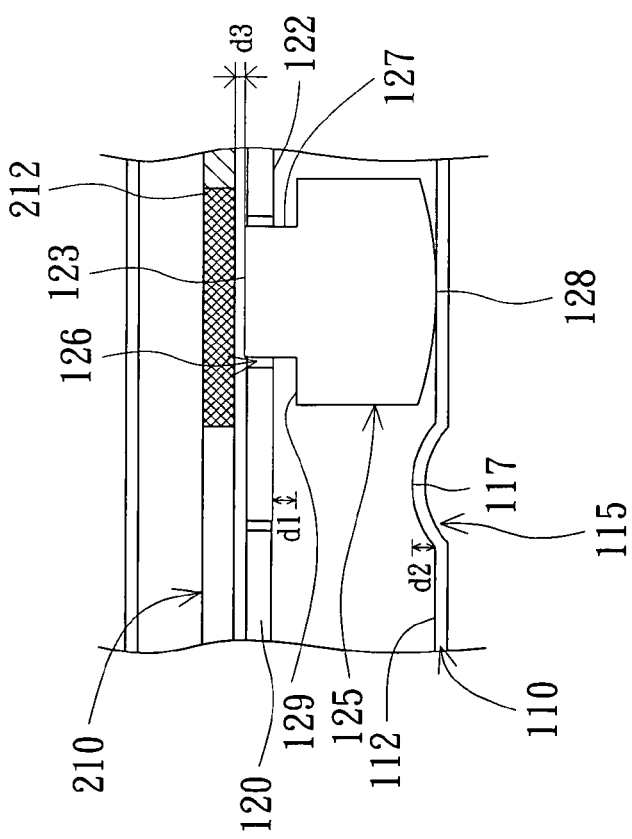

Next, referring to FIG. 3B, the second interference portion 128 of the brake pad 125 come into contact with the protruding portion 115, but the brake pad 125 has not been raised yet.

Figure 3D:
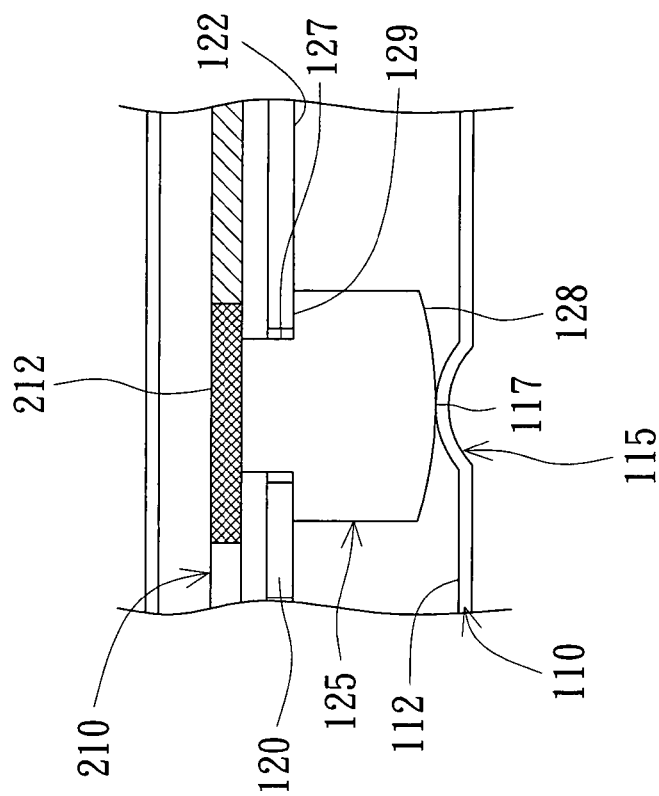
Figure 3C:
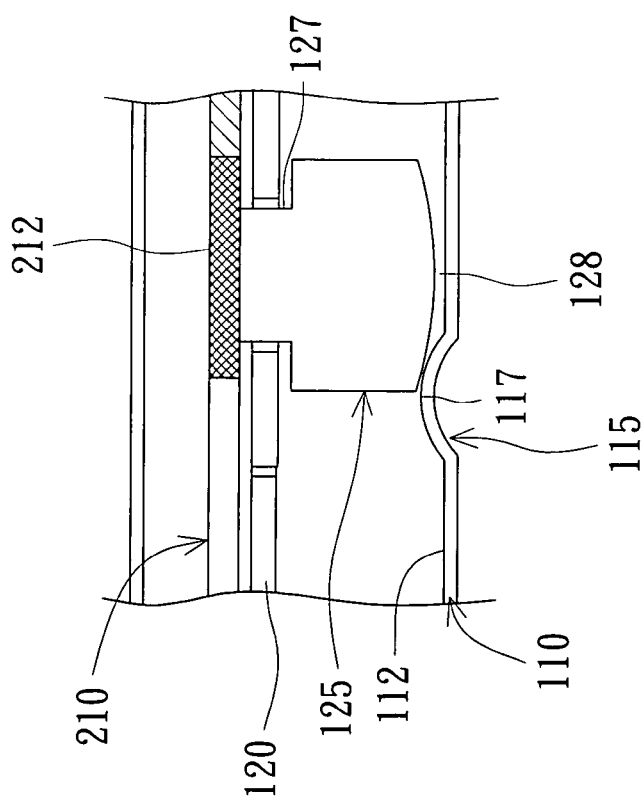

Then, referring to FIG. 3C, the brake pad 125 is raised by the protruding portion 115, and the first interference portion 127 comes into contact with the inner track 212 of the disc 210 and halts the disc 210 by friction.

Next, referring to FIG. 3D, the brake pad 125 is pushed to the apex 117 of the protruding portion 115, the top surface 129 of the second interference portion abuts against the bottom surface 122 of the tray 120 and the first interference portion 127 abuts against the inner track 212 of the disc 210, so that the disc 210 mounted on the spindle 130 of FIG. 1 is raised. The disc is ejected from the tray.

According to the disc loading apparatus for a disc drive and method thereof disclosed in the above embodiment of the invention, in the course of ejecting a disc, a protruding portion and a brake pad interfere with each other for enabling the brake pad to be raised for contact with the disc so that the disc is halted and pushed up. Compared with the prior art which adopts the side interference of anti-friction plate, the method of the invention interferes with the disc from both the top and the bottom, not only halting the disc but also preventing the disc from being thrown off and causing harm to people nearby. Furthermore, the disc is raised and can be pushed up easily. The invention is featured by using simple elements for ejecting the disc to halt and raise the disc to be pushed up.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for ejecting a disc from a disc drive, which includes a bottom casing and a tray used for carrying the disc, and the apparatus comprises:
   a protruding portion disposed on the bottom casing; and
   a brake pad movably disposed at the tray;
   wherein, when the tray is moved with respect to the bottom casing and the protruding portion interferes with the brake pad, the protruding portion pushes the brake pad to project towards the disc for interfering with the disc, so that the disc is halted and pushed up.

2. The apparatus according to claim 1, wherein the tray has a hole aligned with the brake pad, and the brake pad projects from the hole when the protruding portion interferes with the brake pad.

3. The apparatus according to claim 2, wherein the brake pad further comprises:
   a first interference portion; and
   a second interference portion connected to the first interference portion, wherein a cross-sectional area of the first interference portion is smaller than a cross-sectional area of the second interference portion;
   wherein, the protruding portion interferes with the second interference portion so that the first interference portion interferes with the disc.

4. The apparatus according to claim 3, wherein a size of the hole is at least equal to the cross-sectional area of the first interference portion but smaller than the cross-sectional area of the second interference portion.

5. The apparatus according to claim 4, wherein the protruding portion has an apex, and before the protruding portion get into contact with the brake pad, a first vertical distance between a top surface of the second interference portion and a bottom surface of the tray is at least equal to a second vertical distance between the apex and an inner surface of the bottom casing.

6. The apparatus according to claim 5, wherein before the protruding portion contacts the brake pad, a third vertical distance between a top surface of the first interference portion and the disc is smaller than the second vertical distance.

7. The apparatus according to claim 2, wherein the hole is corresponding to an inner track of the disc, and the brake pad projects from the hole and come into contact with the inner track.

8. A method of ejecting a disc for a disc drive, which includes a bottom casing and a tray used for carrying a disc, and the method comprises:
   moving the tray with respect to the bottom casing, wherein the tray has a brake pad and the bottom casing has a protruding portion;
   interfering with the brake pad by the protruding portion so as to push the brake pad; and
   interfering with the disc by the pushing of the brake pad.

9. The method according to claim 8, wherein the tray has a hole, and the step of interfering with the brake pad by the protruding portion comprises:
   pushing the brake pad to move towards the disc by the protruding portion so that the brake pad projects with respect to the hole.

10. The method according to claim 9, wherein the step of interfering with the disc by the brake pad comprises:
    penetrating the brake pad through the hole for contact with the disc;
    halting the disc; and
    pushing up the disc.

11. The method according to claim 10, wherein the protruding portion has an apex, the disc is mounted on a spindle of the tray, and the disc is pushed up from the spindle when the apex come into contact with the brake pad.

12. The method according to claim 10, wherein the hole is corresponding to an inner track of the disc, and the brake pad penetrates through the hole for contact with the inner tracks.

13. The method according to claim 8, wherein the brake pad further comprises a first interference portion and a second interference portion, and the protruding portion interferes with the second interference portion so that the first interference portion interferes with the disc.

14. A disc drive, comprising:
   a top casing and a bottom casing;
   a tray disposed between the top casing and the bottom casing for carrying a disc; and
   a disc ejecting apparatus, wherein the disc ejecting apparatus includes:
      a protruding portion disposed on the bottom casing; and
      a brake pad movably disposed at the tray;
   wherein, when the tray is moved with respect to the bottom casing and the protruding portion interferes with the brake pad, the protruding portion pushes the brake pad to projects towards the disc, so that the disc is halted and pushed up.

15. The disc drive according to claim 14, wherein the tray has a hole aligned with the brake pad, and the brake pad projects from the hole when the protruding portion interferes with the brake pad.

16. The disc drive according to claim 14, wherein the brake pad further comprises:
   a first interference portion; and
   a second interference portion connected to the first interference portion, wherein a cross-sectional area of the first interference portion is smaller than a cross-sectional area of the second interference portion;
   wherein, the protruding portion interferes with the second interference portion so that the first interference portion interferes with the disc.

17. The disc drive according to claim 14, wherein a size of the hole is at least equal to a cross-sectional area of the first interference portion but smaller than a cross-sectional area of the second interference portion.

18. The disc drive according to claim 14, wherein the protruding portion has an apex, and before the protruding portion get into contact with the brake pad, a first vertical distance between a top surface of the second interference portion and a bottom surface of the tray is at least equal to a second vertical distance between the apex and an inner surface of the bottom casing.

19. The disc drive according to claim 18, wherein before the protruding portion contacts the brake pad, a third vertical distance between a top surface of the first interference portion and the disc is smaller than the second vertical distance.

20. The disc drive according to claim 14, wherein the hole is corresponding to an inner track of the disc, and the brake pad projects from the hole and come into contact with the inner track.

* * * * *